United States Patent

[11] 3,581,154

[72] Inventors J. Hebden Willox, 917 Newcastle Ave., Westchester, Ill. 60153
[21] Appl. No. 877,716
[22] Filed Nov. 18, 1968
[45] Patented May 25, 1971

[54] SURGE-DEFLECTING CABLE TERMINATOR
20 Claims, 4 Drawing Figs.
[52] U.S. Cl. ................................. 317/61.5, 174/73, 317/72, 317/73
[51] Int. Cl. ................................. H02h 9/06
[50] Field of Search ............................ 317/73, 76, 72, 61.5; 174/73, 80; 336/69, 70, 175, 177

[56] References Cited
UNITED STATES PATENTS
| | | | |
|---|---|---|---|
| 1,486,873 | 3/1924 | Fortescue .................... | 317/73 |
| 1,664,494 | 4/1928 | Smith .......................... | 317/61.5X |
| 2,233,939 | 3/1941 | Miller .......................... | 317/61.5X |
| 3,377,420 | 4/1968 | Brown et al. ................ | 174/73 |
| 3,479,443 | 11/1969 | Mashikian et al. ........... | 174/73 |

Primary Examiner—James D. Trammell
Attorney—Ralph R. Pittman

ABSTRACT: A weathertight surge-responsive electrical cable terminator, adapted for use in connecting an underground insulated cable to an exposed overhead conductor, includes a housing of insulating material in which the cable end is hermetically sealed alongside a member of magnetic material. Lightning surges transmitted by the exposed overhead conductor to the point of connection are deflected by the electromagnetic cooperation of the magnetic member with the surge current upon its appearance in the terminator. The terminator is effective either as a reflector to turn the surge back to the overhead conductor, or as a diverter to direct the surge to an associated lightning arrester.

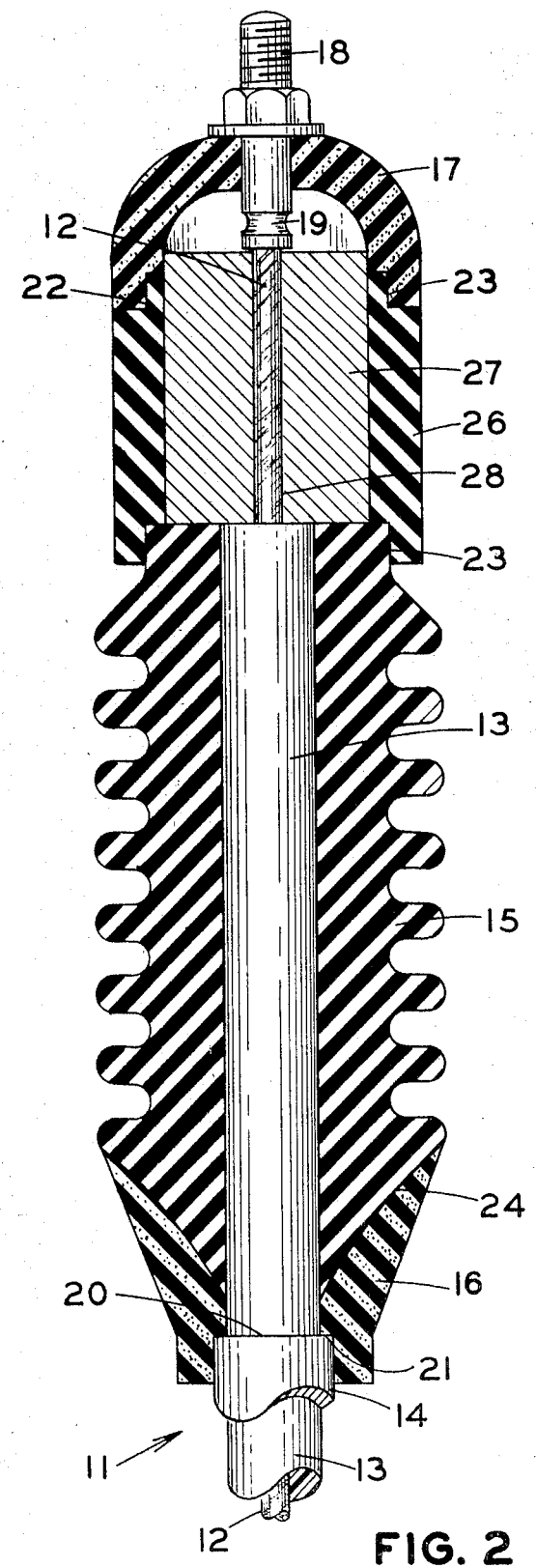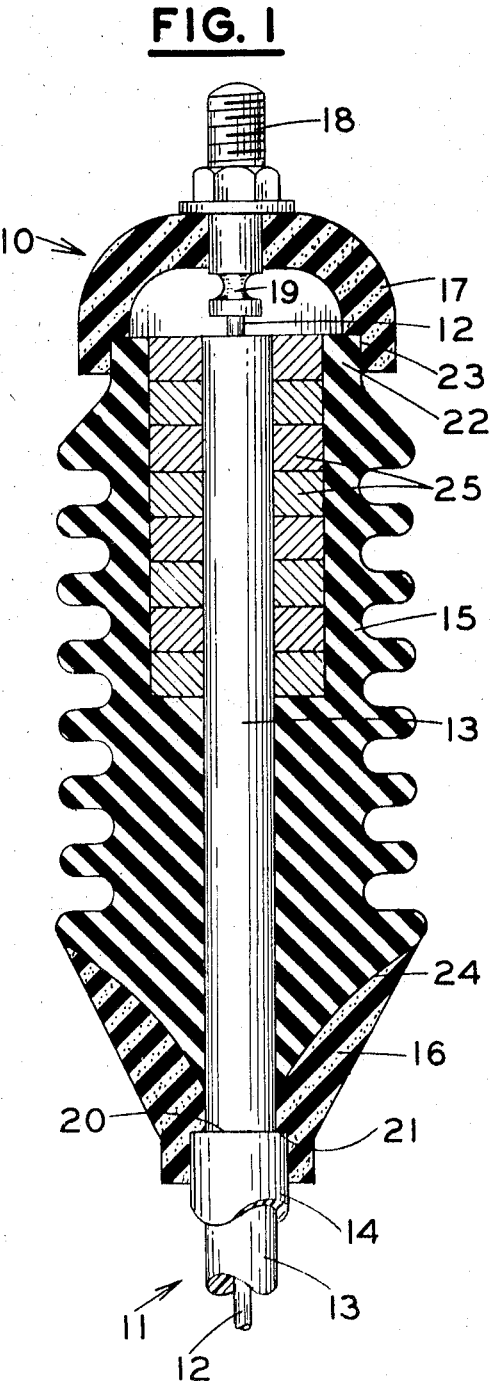

PATENTED MAY 25 1971

INVENTOR.
"J" Hebden Willox
BY Ralph R. Pittman
Agent

SURGE-DEFLECTING CABLE TERMINATOR

BACKGROUND

This invention relates to terminators and potheads for electrical power cables, and particularly to a termination construction embodying magnetic means facilitating the deflection from the cable of transient electrical surges at its point of connection with an exposed overhead line conductor.

A shielded underground cable, wherever directly connected to an exposed overhead conductor, is susceptible to insulation failure as a result of surges of electrical energy, such as may be caused by lightning discharges impinging on the exposed overhead conductor and transmitted therealong to a point of connection with the underground cable riser.

A principal causal consideration contributing to the susceptibility to failure by reason of excessive voltage stress across the insulation of the underground cable is the relatively large difference between the surge impedance of the overhead line conductor and the ground-shielded underground conductor. This large difference in impedance to the movement of electrical transients results largely from the fact that the capacitance to ground of the underground conductor, because of its small insulation separation from ground, is much greater per unit of length than that of the overhead conductor, with its relatively large air separation from ground.

The surge impedance of a typical overhead conductor is of the order of 400 ohms; an underground cable conductor has a surge impedance of about 20 ohms. A transient surge moving along an overhead line to a junction with an underground cable will divide inversely impedancewise, about 95 percent moving into the cable and 5 percent moving past the junction along the overhead conductor.

The surge-protection problem arising from the electrical discontinuity at the point of connection of a ground-shielded underground cable to an elevated open wire conductor has been long recognized. Among the several protective arrangements which have been useful are (1) the parallel connection, at the point of connection, of a relatively large capacitor and a lightning arrester between the overhead conductor and ground and (2) the installation of lightning arresters at selected spaced intervals along the underground cable to thereby limit the rise in potential of each spaced section of the cable to a value below the breakdown voltage of the cable insulation.

PRIOR ART

A large variety of weatherproof cable termination constructions have heretofore been utilized in connecting exposed overhead conductors to shield underground cables, solely for the purpose of precluding entrance of damaging moisture into the cable.

There appears no suggestion in the prior art of any underground cable terminator of the pothead, or any other type, in which is embodied a surge-responsive inductive component disposed contiguous to the housed through-lead in the terminator, the construction functioning to limit the superimposed surge voltage which can be transmitted to an underground cable from an electrically connected overhead conductor exposed to lighting strokes, the limitation being effected either by reflecting a portion of the surge back to the overhead conductor, or alternately by diverting a portion of the surge to ground through an associated lightning arrester.

SUMMARY OF THE INVENTION

The operation of the invention is based upon its inherent ability to respond to superimposed surge currents caused by atmospheric discharges, or otherwise, while being insignificantly affected by normal alternating dynamic alternating current. This selective ability is achieved by the introduction within the terminator at the cable end of a magnetic element which changes the terminal end of the cable from a predominately capacitive structure to a lumped inductance. As is commonly known, a surge current meeting a capacitance member is accelerated in time to lead the impelling voltage, and contrawise, a surge current meeting an inductance member is retarded in time to lag the associated voltage.

The increased self-induction established within the cable terminating housing will respond to a surge current to effect a delay in time and correspondingly increase the voltage across the cable end as a function of the rate of change of surge current; (i.e. L di/dt, L representing the inductance and di/dt the rate of change of current). Lightning currents and surge transients generally are characterized by exceedingly rapid change in amplitude, with rates of rise of the order of thousands of amperes per microsecond. With such rapidly varying current, a relatively small inductive barrier is required to build up a substantial additive reflected voltage, to thereby deflect a portion of the energy of the surge away from the cable and back to the overhead line extending beyond the point of connection, or alternately, to discharge to ground through an associated voltage limiting spark gap or a lightning arrester.

It is therefore an important object of the present invention to provide an underground cable termination structure which includes a housed magnetic member disposed within the structure and adjacent to the terminal end of the terminated cable. Another object is the provision of a terminator capable of selecting, in accordance with the rate of change of current, high-current superimposed surges for reflection or diversion from the entrance to the cable; a further object is the provision of a housing extension, having an inductive element disposed therein, suitable for combining with a conventional cable terminator.

BRIEF DESCRIPTION OF THE DRAWING

FIG. 1 is an elevational view, partly in section, showing a preferred embodiment of a cable-terminating device, characterized by the disposition of a surge-responsive member within the housing of a conventional cable terminator;

FIG. 2 is an elevational view, similar to FIG. 1 as to form, which shows an alternate embodiment, in which the incorporated surge-responsive member is disposed within a housing extension merged with the housing of common type of terminator;

DESCRIPTION OF THE PREFERRED EMBODIMENTS

Figure 3:
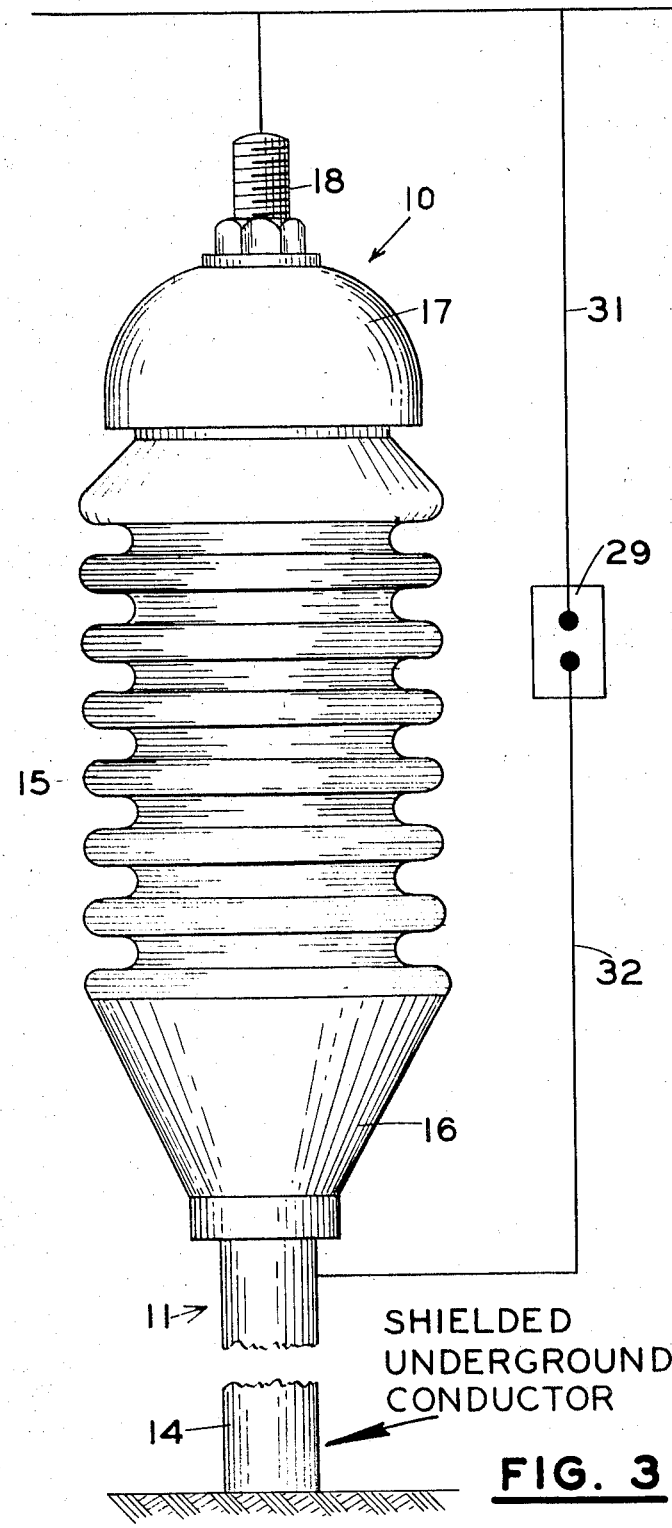
FIG. 3 is an elevational view of the terminator of FIG. 1, showing an associated lightning arrester.

As shown in FIG. 1, the terminator 10, sometimes called a pothead, includes such well-known members as an exteriorly corrugated or skirted housing 15 having an interior cable-receiving opening or cavity. The housing may be formed from any one of a number of insulating materials, such as porcelain, epoxy resin or some rubberlike elastomer.

The underground cable 11 comprises the concentric solid dielectric insulating cover 13 over the central conductor 12, and the outer grounded conducting shield jacket 14. To prepare the cable end for its reception in the terminator, an end portion of the conducting outer jacket 14 is removed to the shoulder 20, an end portion of the insulation and conductor projecting therefrom.

A stress cone 16 is fitted in pressure contact with both the lower surface 24 of the housing 15 and the grounded conducting shield 14 at the stepped lower end 21 of the stress cone. The stress relief cone 16 is preferably formed from a conductive elastomer, such as neoprene admixed with conducting particles, a continuous interfacial pressure being desired between the abutting surfaces to avoid insulation degradation from the products of electrically overstressed air, such as ultraviolet energy and ozone.

The unshielded end portion of the cable 11 extends through the central cavity within the housing 15 to a point near the terminal or outlet and, at which point a projecting portion of the conductor 12 is joined at the compression joint 19 to the outwardly projecting terminal 18.

A weathertight housing closure gap 17, preferably composed of a conducting elastomer, is provided along its lower edge with a socket 23, into which the upper cylindrical end portion 22 of the body 15 is fitted in resilient engagement therewith. Similarly, the terminal 18 is tightly fitted through a central opening in the closure cap 17.

The cavity within the housing 15 through which the cable end portion extends is enlarged at its upper end, and a plurality of ring-shaped plates 25 of magnetic material are disposed therein in coaxial face-to-face relationship, the housed cable end extending through the aligned openings of the ring-shaped members.

With such a disposition of magnetic material, adjacent to and alongside the cable end, any current appearing in the cable conductor 12 which varies in magnitude with time will respond to the presence of the magnetic material to build up an induced voltage opposing the passage of the current in the circuit of which the cable end is a part, and if the time rate of change increases, the opposing voltage will correspondingly increase.

The invention is shown in elevation in FIG. 3, along with a wiring diagram illustrating the use of the invention in connection with a lightning arrester. The terminator 10 is here shown terminating the shielded underground cable 14 at its point of connection to the exposed overhead conductor 30. The arrester is connected between the overhead conductor and the ground shield jacket 14 by the conductors 31 and 32, or, if no ground shield jacket is used on the cable, the arrester is simply connected to a suitable ground terminal, in which case the earth surrounding the cable functions as a grounded conducting shield.

Figure 4:
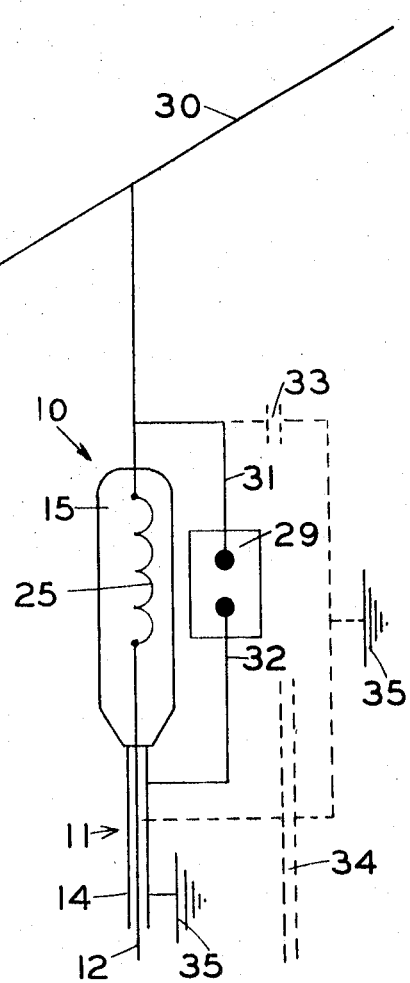
FIG. 4 is an illustrative schematic circuit diagram in which the invention is a part.

The deflection or reflection from the cable of a surge of lightning or switching origin may be accounted for in connection with the schematic circuit diagram of FIG. 4. Assuming that a steep-front superimposed surge arrives at the cable terminator 10, a current surge which is rapidly changing in amplitude moves through the series arrangement of the terminator inductive member 25 and the cable conductor 12, to begin charging the cable capacitance 34. Concurrently, the voltage across the inductance 25 increases as a function of the rate of change of current, which is extremely rapid relative to a normal 60 Hz. current, and this voltage is in the direction to add to the incoming surge voltage. The effect is to deflect a substantial portion of the surge away from the cable and into the extended overhead conductor.

As indicated by the broken lines of FIG. 4, the capacitance to ground 33 of the overhead conductor is much less per unit length than that of the capacitance to ground 34 of the underground conductor. When associated with surge voltages and currents which rise at rates in the thousands of volts and amperes per microsecond, only a small capacitor is required to pass a substantial current, and only a small inductor is required to yield a substantial reflected voltage.

Voltage built up across the inductive arrangement is immediately diverted to a lightning arrester when connected as indicated in FIGS. 3 and 4, and thus its sparkover is not delayed until the cable capacitance is fully charged, as would be the situation without the accelerated voltage buildup.

Magnetic members small enough to be contained within a conventional terminator housing will provide the desired added self-induction, and in general any ferromagnetic material is suitable. Ferrites having high resistivity are advantageous from the loss standpoint for the lower voltage, higher current circuits, despite the fact that ferrites in general have a relatively low saturation intensity. It has been demonstrated by surge generator tests that two ring-shaped ferrite members, each having a height of one-half inch and outside and inside diameters of 1 and three-eight inch respectively provide ample surge impedance to cause discharge of an associated 5 kilovolt valve-type lightning arrester.

Since effective operation of the terminator is completely dependent upon its rate of response as it looks at a surge current, it is desirable to employ materials characterized by low magnetic viscosity, and since a magnetically unsaturated condition of the magnetic material is most favorable for optimum voltage buildup per microsecond, a magnetic material having a high saturation intensity is desirable. As an example, a cobalt-iron alloy is well known that has a saturation intensity of the order of 24 kilogausses, substantially higher than that of pure iron. The specific size, shape and material of the magnetic member or members is of course finally a matter of relating the circuit constants to the insulation of the equipment with which it is associated.

The terminator illustrated in FIG. 2 is an extended housing construction, the tubular compartment 26 being coextensive with the housing portion 15, and fitted at its outer end with the terminal cap 17. A cylindrical magnetic member 27, having an axial bore 28, is disposed within the compartment 26, the cable conductor 12 being extended to pass through the magnetic member to the outlet terminal 18. This embodiment of the invention enables a more intimate association of the magnetic member with its cooperating conductor, these members being in physical contact. This construction is also somewhat better adapted for higher voltage circuits than that depicted by FIG. 1, for the reason that a longer internal leakage path within the housing and over the outer surface of the insulation from conductor to ground is provided.

What I claim is:

1. A surge-responsive terminator for underground cable comprising a housing of insulating material, magnetic means disposed within said housing, said magnetic means including at least one discrete member of magnetic material, an elongated cavity within said housing for receiving an end portion of the type of electrical cable which includes a central conductor and a concentric jacket of insulation over the conductor, said cavity extending adjacent to and alongside said magnetic means, said magnetic means being effective to influence the electromagnetic field about the end portion of a cable conductor disposed in said cavity in response to the time rate of change of an electrical current occurring therein, and terminal means at the cable end of said housing for connection to said conductor.

2. The terminator as defined in claim 1, wherein said magnetic means comprises a member of magnetic material surrounding said end portion.

3. The terminator as claimed in claim 1, wherein the magnetic means within the housing is effective to augment the electromagnetic field about the housed end portion of the cable in response to the time rate of change of an electrical current occurring therein to an intensity substantially greater than that due to the self-induction of the housed portion absent said magnetic means.

4. The terminator according to claim 3, wherein said magnetic means is formed as a hollow cylinder of magnetic material through which the terminal portion of said conductor extends.

5. The terminator according to claim 2, wherein a portion of said jacket of insulation is removed to bare a terminal portion of said conductor, and said magnetic means is formed as a cylinder of magnetic material having a central bore through which the terminal portion of the conductor extends.

6. The terminator as claimed in claim 3, in which said magnetic means comprises a stacked group of discrete rings of magnetic material through which said housed end portion extends.

7. The terminator in accordance with claim 2, wherein said magnetic means is composed of a material selected from a group of magnetic alloys having a saturation intensity greater than pure iron.

8. The terminator as claimed in claim 4, in which said magnetic means comprises a member of magnetic material composed of a high saturation cobalt-iron alloy.

9. The terminator according to claim 6, wherein said rings of magnetic material are each constituted as a sintered ferrite.

10. The terminator as claimed in claim 2, including a weathertight closure at the outlet end of said housing.

11. A weathertight surge-responsive terminator adapted for use in electrically connecting a shielded underground cable to an exposed overhead conductor, said cable including a central conductor, a covering of insulation over said conductor and a conducting ground shield over said insulation, an end portion of said ground shield being removed from said cable to provide an insulated unshielded elongated end portion; said terminator comprising a tubular housing of insulating material having an annularly corrugated exterior and an elongated interior cavity for receiving the unshielded elongated end portion of said cable, terminal means at the outlet end of said housing connected to said central conductor, magnetic means disposed within said cavity adjacent to said terminal means, said magnetic means encompassing said conductor and being susceptible to electromagnetic induction upon the passage of a time rate of change of electrical current magnitude therein, closure means associated with the outlet end of said housing, and a stress-relief cone of conducting material fitted over the other end of said housing, said cable extending through said other end of said housing in electrical contact with said conducting ground shield.

12. The terminator in accordance with claim 11, wherein said housing includes at the outlet end a coextensive hollow cylindrical extension of insulating material defining an inwardly enlarged end portion in which said magnetic means is disposed.

13. The terminator according to claim 12, in which a portion of the jacket of insulation is removed to bare a terminal portion of said cable conductor, and said magnetic means is in the form of a hollow cylinder of magnetic material through which the terminal portion of said conductor extends.

14. The terminator as claimed in claim 13, wherein said magnetic means is composed of a material selected from a group of iron alloys having a magnetic saturation intensity greater than that of pure iron.

15. The terminator as defined in claim 13, in which the cylinder of magnetic material is composed of a high-saturation intensity cobalt alloy.

16. The terminator as defined in claim 12, in which an end portion of the insulation is removed to bare an end portion of the cable conductor within the housing, and said magnetic means comprises a group of similar annular plates stacked in face-to-face abutting relationship, the uninsulated end portion of the cable conductor extending along and through the respective openings of said plates.

17. A system for precluding damage to an underground cable from excessively high surge voltages transmitted into the underground cable from a point of connection with an overhead line exposed to lightning strokes, said system comprising in combination an exposed overhead conductor electrically connected to a ground-shielded insulated underground conductor, a lightning arrester connected between said overhead conductor and ground, said arrester having a predetermined voltage sparkover characteristics, and a surge-responsive terminator connected in parallel circuit relation with said lightning arrester, said terminator comprising a housing of insulating material having an elongated cavity for receiving an end portion of said cable, terminal conducting means at one end of said housing connected to the underground cable conductor interior of said housing and to the overhead conductor exterior of said housing, and surge-sensitive means associated with said end portion of said cable within said housing, said surge-sensitive means cooperating with said cable to effect sparkover of said arrester when a surge current having a predetermined time rate of rise moves from said exposed overhead conductor across said end portion of said cable.

18. The system in accordance with claim 17, wherein said surge-sensitive means includes at least one member of magnetic material surrounding said underground conductor.

19. The system as claimed in claim 18, in which said ground-shielded cable includes an outer grounded conducting cover and said lightning arrester is connected between said overhead conductor and said outer grounded conducting cover.

20. The system as claimed in claim 19, including a stress-relief cone of electrically conducting material fitted over the end of the housing through which said cable is received, said relief cone abutting the outer surface of a portion of said grounded conducting cover in electrical contact therewith.